US012451001B2

(12) United States Patent
Levitian et al.

(10) Patent No.: US 12,451,001 B2
(45) Date of Patent: Oct. 21, 2025

(54) USE OF CROWDSOURCING AS BASIS TO PREDICT EMERGENCY IMPACT AND TO FACILITATE EMERGENCY RESPONSE

(71) Applicant: Roku, Inc., San Jose, CA (US)

(72) Inventors: Karina Levitian, Austin, TX (US); Charles Brian Pinkerton, Boulder, CO (US); Sunil Ramesh, Cupertino, CA (US); Michael Cutter, Golden, CO (US)

(73) Assignee: Roku, Inc., San Jose, CA (US)

( * ) Notice: Subject to any disclaimer, the term of this patent is extended or adjusted under 35 U.S.C. 154(b) by 157 days.

(21) Appl. No.: 17/932,435

(22) Filed: Sep. 15, 2022

(65) Prior Publication Data

US 2024/0013653 A1 Jan. 11, 2024

Related U.S. Application Data

(63) Continuation-in-part of application No. 17/860,649, filed on Jul. 8, 2022, now Pat. No. 11,763,656.

(51) Int. Cl.

| | |
|---|---|
| ***G08B 31/00*** | (2006.01) |
| ***G08B 25/00*** | (2006.01) |
| ***G08B 27/00*** | (2006.01) |

(52) U.S. Cl.
CPC ........... *G08B 31/00* (2013.01); *G08B 25/006* (2013.01); *G08B 27/005* (2013.01)

(58) Field of Classification Search
CPC .... G08B 31/00; G08B 25/006; G08B 27/005; G08B 29/188; G08B 21/10; H04L 12/12; H04L 12/282; H04L 12/2825
See application file for complete search history.

(56) References Cited

U.S. PATENT DOCUMENTS

| | | | | |
|---|---|---|---|---|
| 10,137,984 | B1 * | 11/2018 | Flick | G06V 20/13 |
| 2002/0170595 | A1 * | 11/2002 | Oliver | G05B 9/02 340/689 |
| 2012/0280823 | A1 * | 11/2012 | Yang | G08B 21/10 340/669 |
| 2016/0173963 | A1 * | 6/2016 | Filson | G08B 21/10 340/870.09 |
| 2017/0221337 | A1 * | 8/2017 | Jose | G08B 21/10 |
| 2019/0187643 | A1 * | 6/2019 | Carpenter | H04W 4/38 |
| 2020/0090492 | A1 * | 3/2020 | Flaster | G08B 17/10 |
| 2021/0280034 | A1 * | 9/2021 | Wedig | G08B 29/186 |

* cited by examiner

*Primary Examiner* — Quan Zhen Wang
*Assistant Examiner* — Rajsheed O Black-Childress
(74) *Attorney, Agent, or Firm* — McDonnell Boehnen Hulbert & Berghoff LLP

(57) ABSTRACT

A method and a system for using crowdsourcing as a basis to predict and respond to emergency impact. An example method includes (i) a computing system receiving emergency-state reporting provided by multiple customer premises in a region, (ii) the computing system determining, based on the received emergency-state reporting provided by the multiple customer premises in the region, that a region-wide emergency situation exists in the region, and (iii) the computing system taking action, in response to the determining, based on the emergency-state reporting provided by the multiple customer premises in the region, that the region-wide emergency situation exists in the region.

23 Claims, 7 Drawing Sheets

USE OF CROWDSOURCING AS BASIS TO PREDICT EMERGENCY IMPACT AND TO FACILITATE EMERGENCY RESPONSE

REFERENCE TO RELATED APPLICATION

This is a continuation-in-part of U.S. patent application Ser. No. 17/860,649, filed Jul. 8, 2022, the entirety of which is hereby incorporated by reference.

SUMMARY

Modern customer premises, such as homes, hotels, or offices, are increasingly equipped with many devices that are configured to engage in network communications. These devices may range from traditional internet-connected equipment such as personal computers, telephone systems, security systems, gaming systems, and over-the-top (OTT) streaming media players, to newer "Internet of Things (IoT)" equipment including "smart home" devices such as connected appliances, utilities, lights, switches, power outlets, and speakers, as well as wearable devices such as watches and/or health monitors, among countless other examples.

A typical customer premises may have a wide area network (WAN) connection with the internet as well as a local area network (LAN) through which on-premises devices such as those noted above could engage in internet communication over the WAN connection. For instance, the customer premises could be equipped with a cable, satellite, cellular, or other WAN modem configured to connect with an associated head end (e.g., cable or satellite head end or cellular core network) that would provide WAN internet connectivity, and the modem could include or be coupled with a router that would provide LAN connectivity for the on-premises devices, to allow the devices to engage in internet communications through the WAN connection.

With this arrangement, when the WAN modem is initially powered on, the WAN modem may register its presence with the head end, and the head end may assign to the modem a globally-routable Internet Protocol (IP) address, or the modem may have a statically-assigned globally-routable IP address. Further, as each on-premises device is initially powered on and in communication with the router, the device may likewise register its presence with the router, and the router may assign to the device a locally-routable IP address, or the device may have a statically-assigned locally-routable IP address (local IP address). Each such on-premises device may then engage in internet communications through the router, modem, and WAN connection, with the router performing standard network address translation between the device's local IP address and the modem's global IP address.

In practice, the internet-connected devices at such customer premises may often engage in internet communication with remote network systems. For example, each of various OTT streaming media players at the customer premises may engage in internet communication with media servers operated by an OTT provider (e.g., virtual multichannel video programming distributor (virtual MVPD)), a security system at the customer premises may engage in internet communication with a central monitoring service, and IoT devices at the customer premises may engage in internet communication with various associated service providers, among numerous other possibilities.

In addition, on-premises devices at customer premises may be capable of communicating with each other and with on-premises devices at other customer premises, with or without internet connectivity. For example, on-premises devices at a given customer premises may be configured to communicate with each other over the customer-premises LAN and/or through wireless mesh networking, among other possibilities. Further, on-premises devices at adjacent or otherwise nearby customer premises may be configured to communicate with each other over the internet or through wireless or wired communication links between the customer premises.

The present disclosure provides for leveraging the connected nature of multiple customer premises in a region as a basis to detect and respond to a possible emergency in the region. In particular, the disclosure provides for crowdsourcing of information from multiple customer premises in the region as a basis to detect likely emergency impact throughout the region, and for responding to the detected likely emergency impact by taking associated remedial action.

Without limitation, an emergency could be a situation that poses an immediate risk to health, life, safety, property or environment and may require urgent assistance to help prevent further illness, injury, death, or other worsening of the situation. For instance, the emergency event may be an earthquake, a typhoon, a hurricane, a flood, or a fire, among other possibilities.

In an example implementation, each of the various customer premises in a region could contain at least one device configured to sense a state that suggests occurrence of an emergency event impacting the customer premises (e.g., a vibration sensor configured to sense vibration suggesting occurrence of an earthquake, a water sensor configured to sense water suggesting occurrence of a flood, or a heat or smoke sensor configured to sense heat or smoke suggesting occurrence of a fire). Further, each such device, or otherwise each such customer premises, could be configured to respond to the sensed emergency state by transmitting to a computing system an associated emergency report that informs the computing system of the sensed emergency state at the customer premises and that correlates with a geographic location of the customer premises.

Based on this emergency-state reporting cooperatively from the multiple customer premises in the region, the computing system could responsively take associated action. For example, the computing system could thereby determine that the multiple customer premises are or will be impacted by the emergency and could responsively cause disconnection of one or more utilities (e.g., electrical, gas, etc.) at the various impacted customer premises, possibly retaining utility connections at select customer premises responsive to a determination that people and pets are not present at the select customer premises. As another example, perhaps based on timing and locations of the emergency-state reports from various customer premises, the computing system could determine a trajectory of the associated emergency impact and, based on the determined trajectory, could predict that another given customer premises is likely to be impacted next; and the computing system could responsively take or trigger associated remedial action as to that other customer premises.

The computing system in this process could be a centralized cloud-based computing system, in which case devices at the various customer premises in the region could provide their emergency-state reports as internet communications to the computing system. Alternatively, the computing system could be decentralized and possibly distributed among the devices at the various customer premises. In a decentralized implementation, devices at various customer premises may convey to each other information about a detected emergency state, with this information propagating from customer premises to customer premises. A device at any given such customer premises may thereby learn that multiple customer premises in its region have reported an emergency state and may responsively take associated remedial action.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
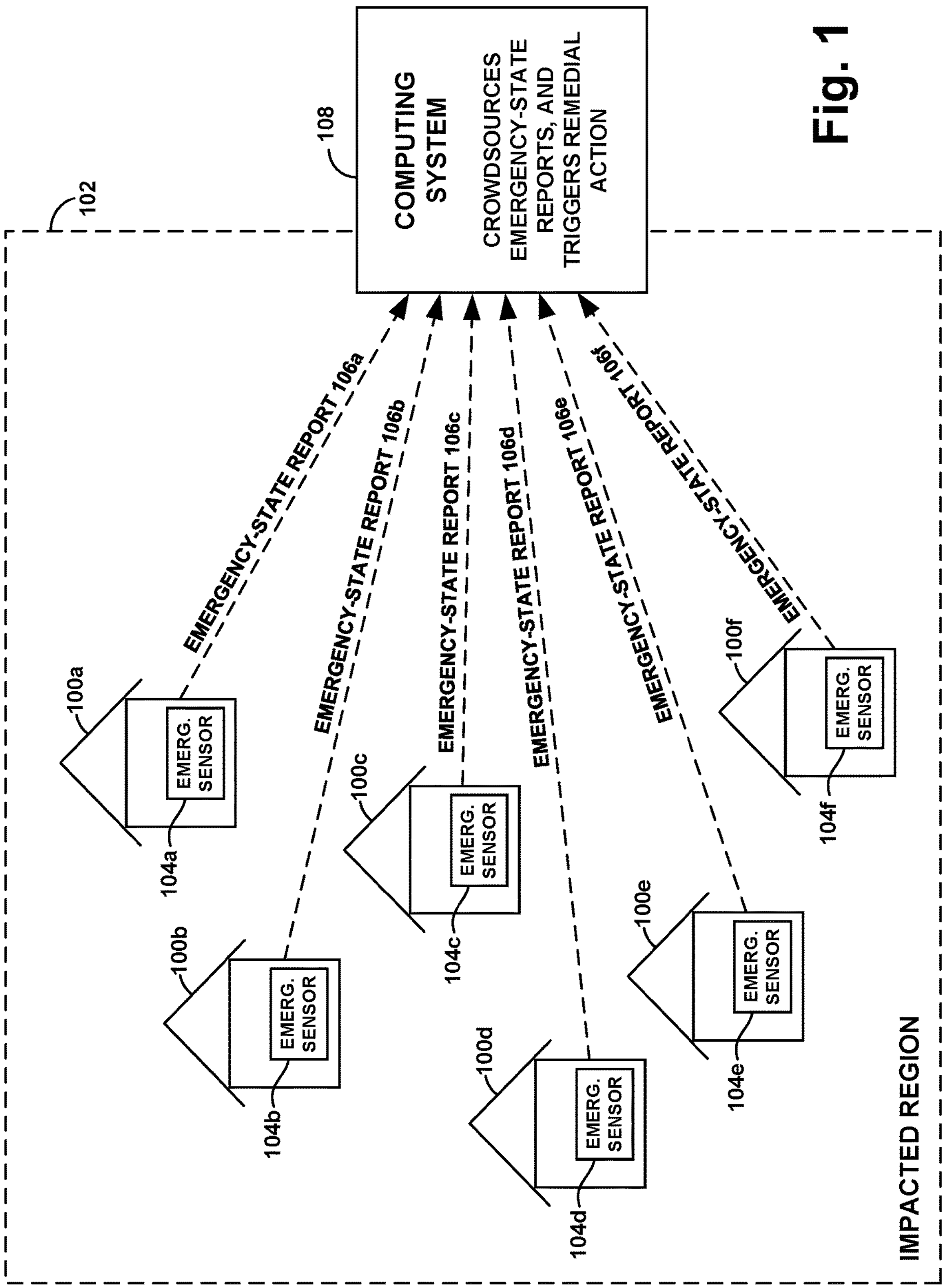
FIG. 1 is a simplified block diagram depicting an example arrangement in which disclosed features can be implemented.

Referring to the drawings, as noted above, FIG. 1 is a simplified block diagram depicting an example arrangement in which various disclosed features could be implemented. It will be understood, however, that this and other arrangements and processes described herein can take various other forms. For instance, elements and operations can be reordered, distributed, replicated, combined, omitted, added, or otherwise modified. Further, it will be understood that functions described herein as being carried out by one or more entities could be implemented by and/or on behalf of those entities, through hardware, firmware, and/or software, such as by one or more processing units executing program instructions or the like.

As shown in FIG. 1, the example arrangement includes multiple customer premises 100 (shown by way of example as customer premises 100*a-f*) in a representative region 102. These multiple customer premises 100 could be individual houses, apartments, condominiums, dorm rooms, schools, businesses, and/or other such facilities or portions of facilities where people could reside, work, visit, or otherwise be present. And the representative region could be a geographic region that encompasses the multiple customer premises, such as a given neighborhood, metropolitan area, and/or business district, among other possibilities, and/or could be another facility or establishment that encompasses the multiple customer premises, such as an apartment or condominium building, an office building, a hotel, a dorm, a shopping mall, and/or another establishment, among other possibilities.

As shown in FIG. 1, each customer premises 100 respectively includes at least one emergency-state sensor 104 (shown as sensors 104*a-f*), which could be a sensor configured to sense an emergency state as noted above, among other possibilities. Further, as shown, each customer premises 100 could be configured to provide emergency-state reports 106 (shown as reports 106*a-f*) to a representative computing system 108. In particular, each customer premises 100 could include equipment configured such that, in response to an emergency-state sensor 104 at the customer premises 100 sensing an emergency state that suggests occurrence of an emergency event impacting the customer premises, the equipment would transmit one or more respective emergency-state reports 106 to the computing system 108.

In an example implementation, the computing system 108 could thus receive the emergency-state reports provided by the multiple customer premises 100 that are in the representative region 102 and could use the emergency-state reports cooperatively from the multiple customer premises 100 in the region 102 as a basis to determine that a region-wide emergency situation exists. For instance, the computing system 108 could determine that at least a predefined threshold number, percent, or other measure defining multiple such customer premises 100 in the region 102 have reported detecting an emergency state, and therefore that an emergency situation may be impacting the region generally. In other words, the computing system 108 could crowdsource the emergency-state reporting from the multiple customer premises 100 to conclude, based on multiple customer premises 100 in the region 102 reporting a detected emergency state, that a region-wide emergency situation exists. The computing system 108 could then respond to that determination by taking associated action.

As noted above, the computing system 108 in this process could be a centralized computing system or decentralized computing system. Without limitation FIGS. 2A and 2B show examples of these two implementations.

Figure 2A:
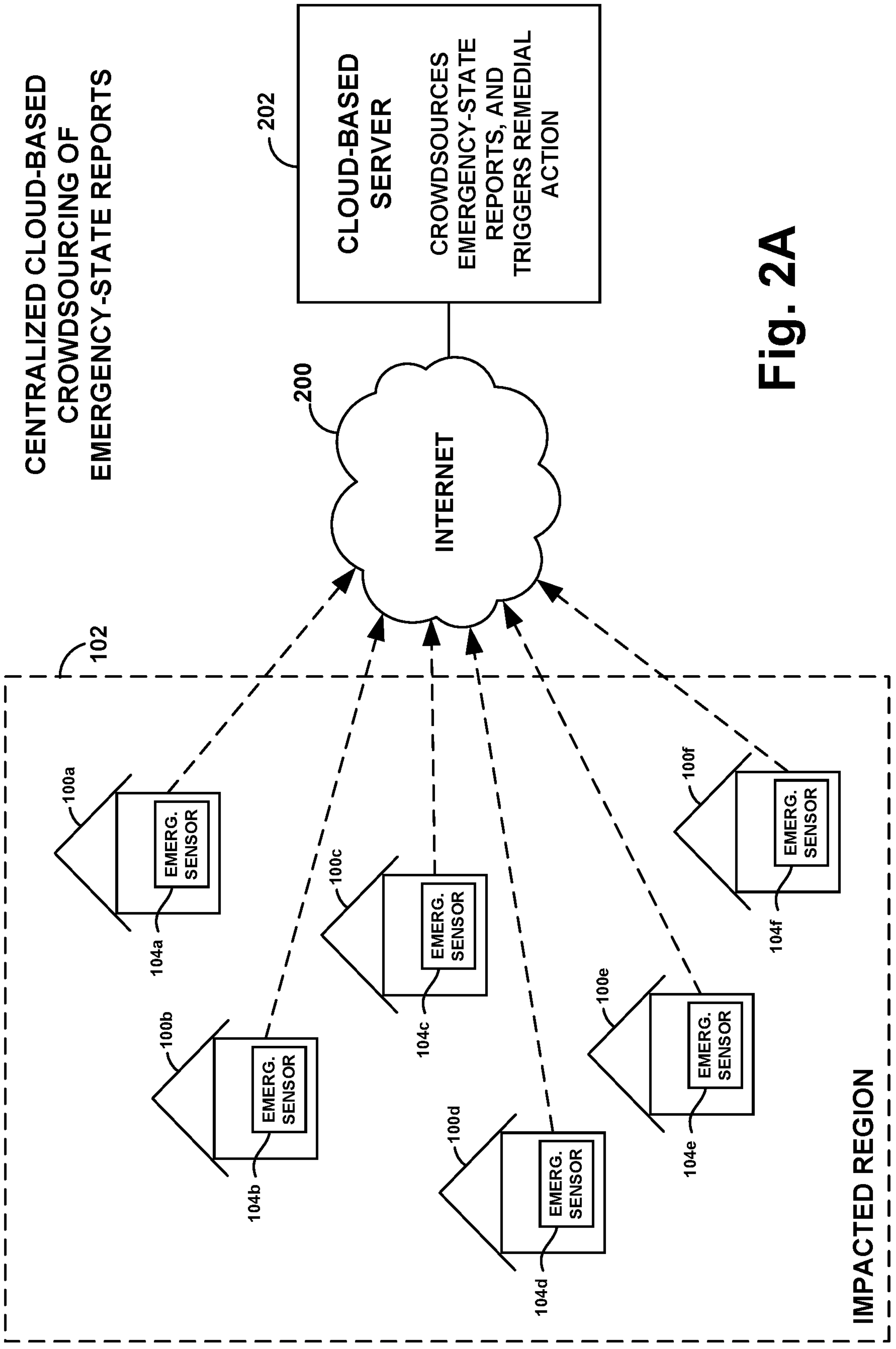
FIG. 2A is another simplified block diagram depicting an example arrangement in which disclosed features can be implemented.

FIG. 2A illustrates an example arrangement with a centralized computing system. In this example arrangement, the multiple customer premises 100 are each coupled with the internet 200, and the centralized computing system comprises a cloud-based server 202 accessible at a predefined internet address (e.g., Internet Protocol (IP) address or Universal Resource Locator (URL)). With this implementation, the emergency-state sensors 104 or other equipment at the various customer premises 100 could each be provisioned with the predefined internet address of the cloud-based server 202 and could be configured to transmit the customer premises' emergency-state reports directly or indirectly to that internet address. The cloud-based server 202 could thus be configured to receive these emergency-state reports from the multiple customer premises 100 in the region 102 and, based on crowdsourcing of the emergency-state reports from the multiple customer premises 100, to conclude that a region-wide emergency situation exists and to responsively take associated action. A similar implementation could instead make use of a centralized server on a smaller scale network such as a LAN for instance.

Figure 2B:
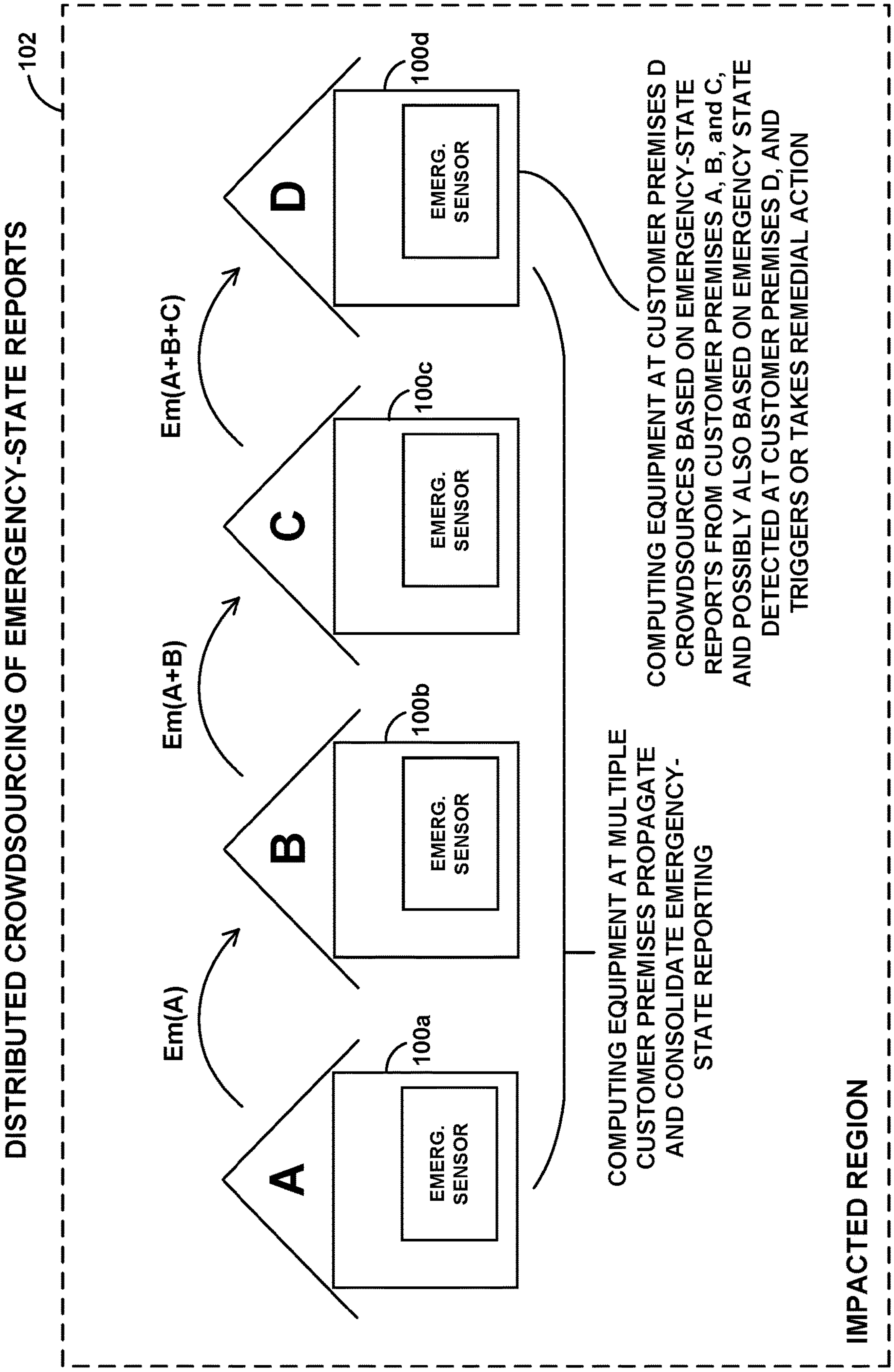
FIG. 2B is another simplified block diagram depicting an example arrangement in which disclosed features can be implemented.

FIG. 2B, on the other hand, illustrates an example arrangement with a decentralized computing system. In this example arrangement, the computing system may be distributed among the various customer premises 100 or located at a given customer premises 100. With this arrangement, the computing equipment at the various customer premises propagate and consolidate emergency-state reporting. For instance, emergency-state sensors or other equipment at the various customer premises 100 could provide emergency-state reports in one or more messages to each other, so that emergency-state reporting could propagate from customer premises to customer premises, ultimately enabling computing equipment at a given such customer premises to learn that a region-wide emergency situation exists and to take associated action.

For instance, with a sequence of customer premises A, B, C, and D as shown, computing equipment at customer premises A may transmit to computing equipment at customer premises B emergency-state reporting Em(A) indicating an emergency state detected at customer premises A, computing equipment at customer premises B may then transmit to computing equipment at customer premises C emergency-state reporting Em(A+B) indicating emergency states detected at both customer premises A and customer premises B, and computing equipment at customer premises C may then transmit to computing equipment at customer premises D emergency-state reporting Em(A+B+C) indicating emergency states detected at customer premises A, B, and C. Computing equipment at customer premises D may then conclude based on the emergency-state reporting from customer premises A, B, and C, and possibly further based on emergency state detected at customer premises D, that a region-wide emergency situation exists and may responsively take associated action.

Transmission of emergency-state reporting from customer premises to customer premises in a decentralized implementation could involve direct peer-to-peer communication, such as over predefined direct wireless or wired communication links between the customer premises. Alternatively or additionally, transmission of emergency-state reporting from customer premises to customer premises in that implementation could involve transmission via network servers, such as through Short Message Service (SMS) transmission, email transmission, or proprietary messaging systems, among other possibilities.

Further, another example implementation could include a combination of these or other types of computing systems. For instance, some customer premises 100 may share their emergency-state reports with each other, and some customer premises 100 may transmit emergency-state reports, possibly including those received from one or more other customer premises 100, to a centralized computing system, which could crowdsource the emergency-state reporting from the multiple customer premises 100 in order to determine that a region-wide emergency situation exists. Alternatively or additionally, some customer premises 100 could transmit their emergency-state reports directly or indirectly to a cloud-based computing system, the cloud-based computing system could transmit to one or more customer premises 100 the received indications of reported emergency state, and equipment at one or more such customer premises 100 could crowdsource that and possibly other received emergency-state reporting in order to determine that a region-wide emergency situation exists. Other arrangements could be possible as well.

To enable the computing system to crowdsource emergency-state reports from various customer premises as a basis to determine that a region-wide emergency situation exists, the emergency-state reports from the various customer premises could indicate the emergency state detected and could further be correlated with geographic or other locations of the reporting customer premises.

As to the emergency state detected, for instance, an emergency-state report respectively from each customer premises could specify a type of emergency detected at the customer premises. For instance, each of various types of emergency state, such as fire (e.g., heat and/or smoke), flood (e.g., water), or earthquake (e.g., vibration), among other possibilities, could be designated by a respective emergency code or other descriptor, and the emergency-state report respectively from each customer premises could use such a descriptor as a basis to indicate the type of emergency state detected at the customer premises.

Upon receipt of emergency-state reports from multiple customer premises in a region, the computing system could then determine whether the same type of emergency state is reported by the multiple customer premises in the region and, if so, could conclude that a region-wide emergency of that type exists. For instance, the computing system could determine that the multiple customer premises report smoke or heat indicating a possible fire, and the computing system could conclude based on those reports that a region-wide fire exists. Alternatively, the computing system could determine that the multiple customer premises report water indicating a possible flood, and the computing system could conclude based on those reports that region-wide flood exists. And still alternatively the computing system could determine that the multiple customer premises report vibration indicating a possible earthquake, and the computing system could therefore conclude based on those reports that a region-wide earthquake impact exists.

As to the locations of the customer premises, when equipment at a given customer premises generates and provides an emergency-state report indicating an emergency state detected at the customer premises, the equipment could include in or with the emergency state report an indication of a location of the customer premises. This indication of location of the customer premises could denote a respective location of the customer premises within the region. For instance, the indication of location could comprise latitude, longitude, and altitude coordinates of the customer premises, street address of the customer premises, or building number, floor, room, and/or other location of the customer premises, among other possibilities, which the equipment at the customer premises could be pre-provisioned with or could determine using any of various position-determining mechanisms. Alternatively, the indication of geographic location of the customer premises could comprise a network address (e.g., IP address) or the like, which the recipient computing system may map to a geographic location of the customer premises. Other examples are possible as well.

Upon receipt of the emergency-state reports from the various customer premises, the computing system could use the indicated locations of the various reporting customer premises as a basis to determine that the emergency state is reported from multiple customer premises within a region, and therefore as a basis to determine (e.g., predict) that the emergency situation exists region-wide. The region at issue could be predefined, and the computing system could determine based on the locations of the reporting customer premises being within the region that many customer premises in the region have reported an emergency state, which could suggest that a region-wide emergency situation exists. Alternatively, by programmatically mapping and evaluating the locations of the various reporting customer premises, the computing system could determine that a cluster of reporting customer premises exists and could determine that a location area encompassing that cluster defines the impacted region.

As a basis to determine that a region-wide emergency situation exists, the computing system could determine that at least a predefined number, percentage, or other count of multiple such customer premises in the region have reported emergency state. For instance, the computing system could determine a count of customer premises that reported detecting emergency state and could determine whether that count, by itself or as a percentage of the total number of customer premises in the region that are equipped to report emergency state, is at least a predefined high count deemed to support a conclusion that a region-wide emergency situation exists. Upon determining that the count is sufficiently, the computing system could then conclude that a region-wide emergency situation exists.

In addition, the computing system could use the timing of emergency-state reports from the various customer premises as a further basis to support a conclusion that a region-wide emergency situation exists. To facilitate this, the emergency-state report respectively from each customer premises could include a timestamp indicating when the emergency state was detected at the customer premises. Based on the timestamps included in the emergency-state reports from the various customer premises in the region, the computing system could thus determine whether an emergency state was detected close enough in time at the various customer premises in the region to support a conclusion that a region-wide emergency situation exists.

In an example implementation, the computing system could also detect an anomaly with respect to emergency-state reporting and could use that anomaly-detection as a basis to control whether to conclude that a region-wide emergency situation exists. For instance, the emergency-state reports from various customer premises could additionally specify what sensors at the customer premises detected an emergency state and could specify the brand(s), model(s), and/or other attributes of those sensors. Based on this information, the computing system may determine that the only sensors that detected an emergency state are sensors of a particular brand, model, and/or other attribute—and perhaps that similar sensors of other brands, models, or other attributes did not detect the emergency state. This could represent a situation where the sensors that detected the emergency state were hacked and/or otherwise malfunctioning. Based on the determination, the computing system may therefore disregard the associated emergency-state reports, and possibly not conclude that a region-wide emergency situation exists.

In addition, if a customer premises includes multiple sensors that could detect a given emergency state, the computing system may also consider whether the multiple sensors detected emergency state, as a basis to control whether to conclude that the emergency state exists. For instance, if a customer premises has both a floor water sensor configured to detect water and a camera (as another form of sensor) configured to detect water in the same location, the computing system may deem emergency state to exist at that customer premises only if both of those sensors detect water. Alternatively, the computing system may prioritize one sensor over another and deem an emergency state to exist only if the higher priority sensor detected the emergency state.

The computing system could also determine that a customer premises that has not provided an emergency-state report may also be impacted by an emergency, based on crowdsourcing of emergency-state reports from other customer premises. For instance, perhaps based on timing and locations of the emergency-state reports from various customer premises, the computing system could determine a trajectory of associated emergency impact and, based on the determined trajectory, could predict that another given customer premises is likely to be impacted next. The computing system could then responsively deem one or more other customer premises to be one of the impacted customer premises and could take associated action.

Figure 3:
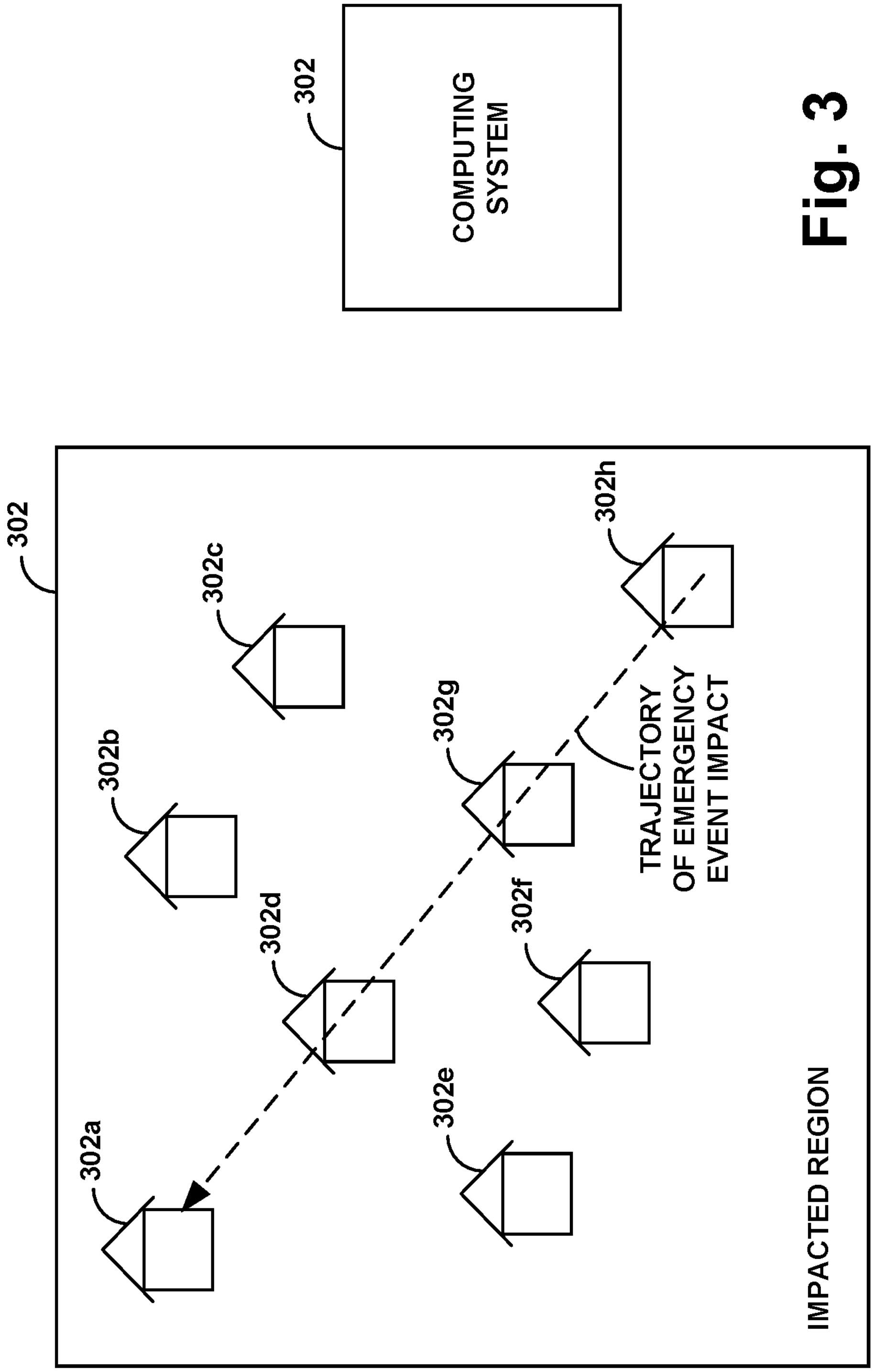
FIG. 3 is a simplified block diagram illustrating an example arrangement including multiple customer premises, with emergency event impact progressing along a trajectory from customer premises to customer premises.

FIG. 3 illustrates an example such scenario. As shown in FIG. 3, a representative region 300 includes multiple customer premises 302*a*-*i*, each of which may contain one or more on-premises computing devices registered and in communication with a representative computing system 302 as discussed above. Based on emergency-state reporting from multiple customer premises in this region, including the location and timing of the reported emergency state, the computing system 302 may determine that emergency impact is headed along a trajectory leading toward another customer premises. For instance, as shown by the dashed arrow in FIG. 3, the computing system 302 may determine from emergency state reports that emergency state was detected in a time and location sequence progressively at customer premises 302*h*, then customer premises 302*g*, and then customer premises 302*d*. Considering the time and location trajectory of these detected emergency states, the computing system 302 could therefore predict that customer premises 302*a* will also soon be emergency-impacted. In response to this prediction, the computing system could therefore consider customer premises 302*a* to be part of the region and to be an impacted customer premises.

Once the computing system determines by crowdsourcing emergency-state reporting by multiple customer premises in the region that a region-wide emergency situation exists, the computing system could then respond to that determination by taking associated action. The action that the computing system takes in response to this crowdsourced determination of a region-wide emergency situation could be remedial action that may help to address the determined emergency situation, and may take any of various forms.

To begin with, the action that the computing system takes could depend on the type of emergency situation detected. For instance, if the emergency situation is a flood, the action could involve causing disconnection of electricity at various customer premises in the region. As another example, if the emergency situation is an earthquake, the action could involve causing disconnection of natural gas feeds to each of various customer premises in the region. These or other types of emergencies could call for other types of responsive action as well.

In response to detecting an emergency in a region encompassing multiple customer premises, the action that the computing system takes could include sending one or more messages to one or more devices at one or more customer premises in the region, to cause the recipient devices to take associated action. The computing system may send these messages to the customer premises that reported detected emergency state, which formed the basis for the crowdsourcing and determining that the region-wide emergency situation exists. Further, the computing system may send these messages to other customer premises in or around the region, such as to customer premises that the computing system has predicted will also be emergency impacted (e.g., based on a location and time trajectory analysis as discussed above, or based on another analysis). The computing system may send these messages to the customer premises via the internet and/or other channels, possibly propagating the messages from customer premises to customer premises, and using any suitable communication protocol. Further, some or all of the devices at the customer premises could subscribe to receive these messages, to facilitate emergency response, so the messaging to those customer premises may be in response to those subscriptions.

By way of example, if the emergency is a flood or other type that would justify turning off power (e.g., electricity) at one or more such customer premises, the one or more messages could selectively cause one or more devices at the various customer premises to turn off the power to the customer premises. The recipient devices in this example could be power-control systems in the customer premises, which could be configured to respond to such messages by disconnecting an electricity feed to the customer premises, such as by switching off a fuse that would normally feed electricity to power outlets and other systems throughout the customer premises.

Further, directives causing disconnection of electricity could be based on whether any people or pets are present at the customer premises. Example customer premises could include motion sensors or other types of sensors for detecting whether any people or pets are present at the customer premises and could provide one or more other devices within the customer premises with an indication of whether any people or pets are present at the customer premises. One or more messages from the computing system could direct the customer premises to disconnect power at the customer premises if any people or pets are present at the customer premises. Equipment at the customer premises could thus determine based on information from the one or more sensors whether any people or pets are present at the customer premises and could use that determination as a basis to control whether to turn off power at the customer premises, turning off power only if there are any people or pets present for instance.

In a scenario where the computing system directs and thus causes multiple customer premises in a region to turn off their power, the computing system may also select one or more of the customer premises to keep their power on, so that equipment at the selected customer premises could later detect an end of the emergency state and could report the detected end of the emergency state to the computing system. For instance, the computing system may select a customer premises to keep its power on, based on a determination that no people or pets are present at the customer premises, which the computing system may learn by presence reports from equipment at the customer premises for instance. Equipment at the selected customer premises may later detect an end of the detected emergency state, such as detecting cessation of heat/smoke, a cessation of water, a cessation of vibration, or the like, and may report accordingly to the computing system, which could facilitate associated action.

Messages that the computing system sends to the customer premises in the region could trigger other types of action as well.

For example, in a scenario where the computing system sends one or more messages to customer premises that have not yet reported detecting emergency state (e.g., to customer premises identified base on a trajectory analysis as discussed above), the one or more messages could cause one or more emergency-state sensors at the customer premises to increase their emergency-state-detecting sensitivities, such as by reducing their thresholds for sensing emergency state. For instance, if an emergency-state sensor at such customer premises is normally configured to detect an emergency state when an emergency-state condition (e.g., heat, smoke, water, vibration, etc.) becomes at least as strong as a first threshold level, the one or more messages could cause such a sensor to reduce its threshold from the first threshold level to a second threshold level that is not as strict as the first threshold level. This process could help enable the emergency-state sensor at the customer premises to more readily detect an emergency state, which may in turn enable more timely responsive action.

As another example, the one or more messages that the computing system sends to the various customer premises could cause one or more battery-powered devices at the customer premises to increase their battery-charging levels. For instance, to the extent a given customer premises contains a device that includes rechargeable batteries and is plugged into an electrical power outlet to keep its batteries charged, the device may normally keep the batteries charged to a default energy level that is deemed best for prolonging life of the batteries, and the one or more messages from the computing system could serve to cause such a device to charge their batteries to an energy level higher than the default, to help ensure that the device will have sufficient battery energy if electricity supply to the customer premises gets lost.

As still another example, the one or more messages that the computing system sends to the various customer premises could cause one or more cameras at the one or more customer premises to turn on and to start capturing video for later analysis. This could help facilitate a later determination of whether there were people or pets present at the customer premises at the time and/or may have other beneficial uses.

As yet another example, the one or more messages that the computing system sends to various customer premises could serve to alert one or more people at the one or more customer premises and may also provide the one or more people with useful information to facilitate further emergency response. For instance, the one or more messages could cause equipment at the recipient customer premises to turn on an alarm sound or light at the customer premises to alert people at the customer premises. Such an alert may also notify people at the customer premises to check the batteries in emergency-state sensors at the customer premises, or to help ensure that the emergency-state sensors will work to detect an emergency state. Further, the one or more messages could be sent directly to personal equipment (e.g., phones, computers, etc.) of people at the customer premises and/or people associated with the customer premises (e.g., people who live or work at the customer premises), and could provide such people with useful information related to the detected emergency state.

In addition or as an alternative to sending one or more messages to one or more customer premises in the impacted region, the computing system could also respond to its crowdsourced determination that a region-wide emergency situation exists by taking other action, such as reporting to an insurance company (e.g., to trigger action such as finding alternate housing or workspace for people at the customer premises), sending necessities (e.g., credit cards, keys, chargers, pharmaceuticals, etc.) to people who may be impacted by the emergency, and/or alerting governmental agencies (e.g., emergency management entities, law enforcement, fire department, etc.), ride share companies, utilities, family members, and/or others.

To facilitate reporting to an insurance company in an example implementation, the computing system may have access to customer-premises profile data that indicates insurance company identity and contact information as to insurance for a given impacted customer premises, and the computing system may refer to that profile data to determine the identity and contact information of the insurance company and may accordingly signal to that insurance company to report the detected emergency state. Further, the computing system could engage in similar processing based on customer-premises profile data, to facilitate sending necessities to impacted people, and alerting ride share companies, utilities, and/or family members, as well as alerting applicable government agencies.

Figure 4:
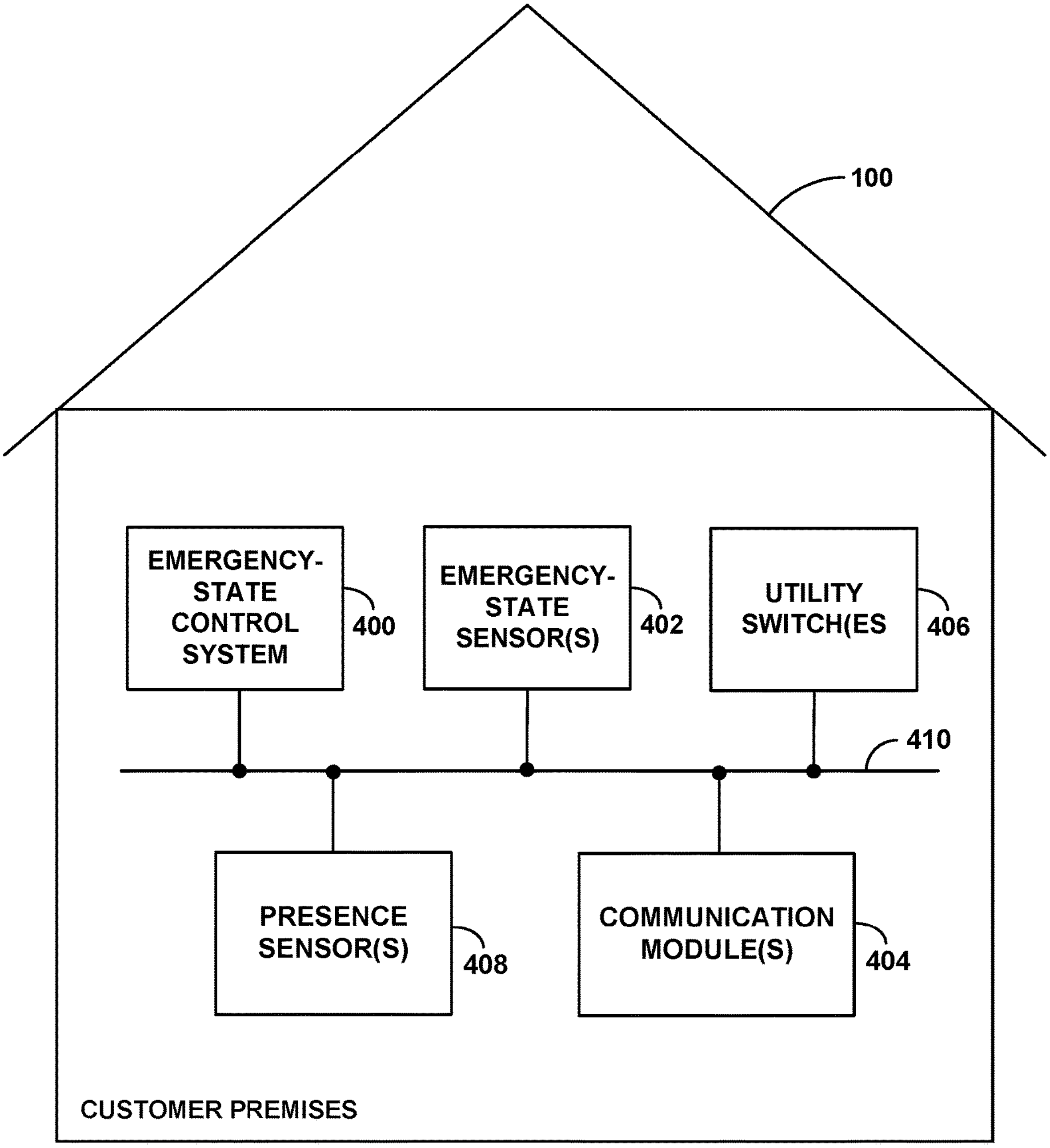
FIG. 4 is a simplified block diagram depicting some components that could be included in example customer premises.

FIG. 4 is next a simplified block diagram showing some of the components that could operate at a given customer premises 100 in order to facilitate emergency-state detecting and reporting and other disclosed operations. As shown by way of example, the customer premises 100 could include an emergency-state control system 400, one or more emergency-state sensors 402, one or more communication modules 404, one or more utility switches 406, and one or more presence sensors 408, all of which could be interconnected by a LAN or other communication mechanism 410. Some or all of these components could be integrated with other components within the customer premises, and could be processor controlled or provisioned to execute program logic, which could be downloaded from a cloud-based system, among other possibilities. Further, although these components are shown inside the customer premises, some or all of these components could be situated outside of the customer premises.

The emergency-state control system 400 could be a core control system in the customer premises, configured to manage and facilitate various customer premises operations described herein. In an example implementation, the emergency-state control system 400 could include one or more processors programmed with instructions to facilitate carrying out associated operations. Further, the emergency-state control system 400 could be configured to communicate with the various other components at the customer premises 100, such as to receive information from those components and to provide information to those components.

The one or more emergency-state sensors 402 could be configured to detect an emergency state at the customer premises. These sensors can take various forms for detecting various types of emergency states. For example, to facilitate detecting fire, an example sensor could be a smoke and/or heat sensor, which could be configured to detect when smoke and/or heat at the customer premises rises above a threshold level, which could be deemed to suggest possible fire. As another example, to facilitate detecting a flood, an example sensor could be a water sensor, which could be configured to detect when water is present in an area in the customer premises to a threshold extent that would suggest a possible flood. Still as another example, to facilitate detecting an earthquake, an example sensor could be a vibration sensor, which could be configured to detect vibration at a threshold level that would suggest a possible earthquake.

These and/or other emergency-state sensors at the customer premises could be configured to respond to their sensed emergency state by signaling to the emergency-state control system 400, which could cause the emergency-state control system 400 to generate and transmit an associated emergency-state report. Alternatively, a given such emergency-state sensor may itself respond to its sensing the emergency state by generating and transmitting an associated emergency-state report.

The one or more communication modules 404 could be configured to support communication related to the detected emergency state. For instance, the one or more communication modules 404 could support communication via a WAN such as the internet, to facilitate emergency-state reporting to a cloud-based computing system and/or to other components of a distributed computing system, to facilitate crowdsourcing of emergency-state information. Alternatively or additionally, the one or more communication modules 404 could support more local communication, such as peer-to-peer wireless or wired communication with other nearby customer premises such as adjacent customer premises for instance. In example implementations, the one or more communication modules could include a router, modem, antenna, and/or other equipment that facilitates local or remote communication with other entities.

The one or more utility switches 406 could be configured to programmatically control various utilities, such as electricity, gas, and water for instance and could take various forms depending on the types of utilities controlled. For instance, a utility switch configured to control electricity could comprise an electrical switch, such as a fuse, that could control whether electricity is fed to the customer premises. Whereas, a utility switch configured to control gas or water could comprise a mechanical valve that could control flow of gas or water to the customer premises. In an example implementation, the emergency-state control system 400 may respond to one or more messages generated as a result of crowdsourcing as discussed above by signaling to one or more such utility switches in the customer premises to direct and thus cause the one or more utility switches to turn off or on a respective utility at the customer premises. As discussed above, for instance, in response to a crowdsourced determination of a likely region-wide flood, the emergency-state control system 400 may receive a message and may responsively cause an electrical switch to turn off electricity at the customer premises.

The one or more presence sensors 408, in turn could be configured to sense presence of people, pets, or the like, at customer premises. For instance, as discussed above, the one or more presence sensors could include motion sensors, cameras, biometric sensors, or other sensors that could sense the presence of people, pets, or the like, and could respond to sensing such presence by signaling to the emergency-state control system 400 and/or to another system to facilitate operations as discussed above for instance.

Figure 5:
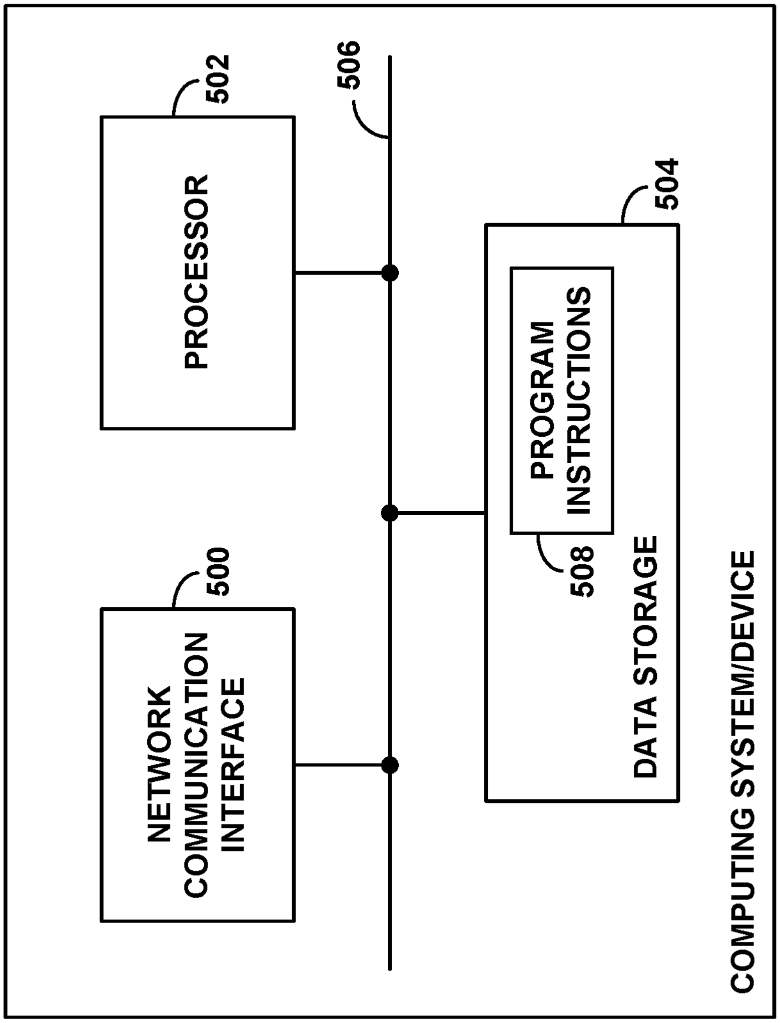
FIG. 5 is a simplified block diagram of a computing system or device operable in accordance with the disclosure.

FIG. 5 is next a simplified block diagram illustrating components of a computing system, computing equipment, or other device operable in the processes described herein. The example arrangement shown in FIG. 5 could represent one or more components of a centralized or decentralized computing system and/or could represent one or more components of various customer premises devices, among other possibilities. As shown in FIG. 5, the example arrangement includes at least one network communication interface 500, at least one processor 502, and at least one non-transitory data storage 504, communicatively linked together by at least one system bus or other connection mechanism 506. Further, the example arrangement may include other components.

The at least one network communication interface 500 could comprise one or more wired and/or wireless network communication modules along with associated drivers and/or other logic, to enable communication over a network such as a LAN or WAN. The at least one processor 502 could comprise one or more general purpose processors (e.g., microprocessors) and/or one or more special-purpose processors (e.g., application specific integrated circuits or digital signal processors). And at least one non-transitory data storage 504 could comprise one or more volatile and/or non-volatile storage components such as magnetic, optical, or flash storage, among other possibilities. As further shown, data storage 504 could hold program instructions 508, which could be executable by the processor 502 to carry out various operations described herein.

Figure 6:
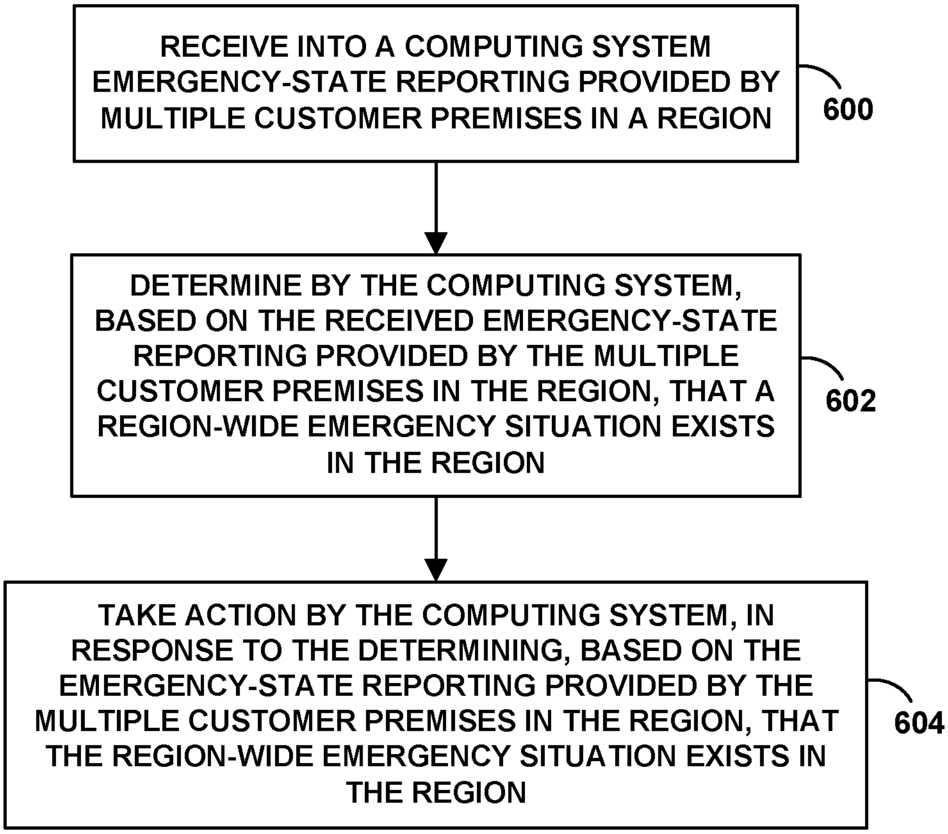
FIG. 6 is a flow chart depicting an example method that can be carried out in accordance with the disclosure.

FIG. 6 is next a flow chart depicting an example method that could be carried out in accordance with the present disclosure to use crowdsourcing as a basis to predict and respond to emergency impact. As shown in FIG. 6, at block 600, the method includes receiving into a computing system emergency-state reporting provided by multiple customer premises in a region. At block 602, the method further includes determining by the computing system, based on the received emergency-state reporting provided by the multiple customer premises in the region, that a region-wide emergency situation exists in the region. And at block 604, the method includes taking action by the computing system, in response to the determining, based on the emergency-state reporting provided by the multiple customer premises in the region, that the region-wide emergency situation exists in the region.

In line with the discussion above, the computing system could be centralized, in which case the act of receiving into the computing system the emergency-state reporting provided by the multiple customer premises in the region could involve receiving by the computing system, respectively from each of the multiple customer premises, an emergency-state report indicating emergency state detected at the customer premises. Alternatively, the computing system could be decentralized, such as by being distributed among the multiple customer premises, in which case receiving into the computing system the emergency-state reporting provided by the multiple customer premises in the region could involve propagating emergency-state reporting from customer premises to customer premises in the region.

As further discussed above, each of the multiple customer premises in the region could include respectively at least one emergency-state sensor configured to sense an emergency state at the customer premises, in which case the emergency-state reporting provided by the multiple customer premises in the region could be emergency-state reporting generated based on emergency-state sensing by the at least one emergency-state sensor respectively at each customer premises in the region.

In addition, as discussed above, the act of determining by the computing system, based on the received emergency-state reporting provided by the multiple customer premises in the region, that the region-wide emergency situation exists in the region could take various forms. For instance, the act of determining that the region-wide emergency situation exists could include determining that the emergency-state reporting from the multiple customer premises in the region indicates a same type of emergency at each of the multiple customer premises. Further, the emergency-state reporting provided by each of the multiple customer premises in the region could correlate with a location of the customer premises, in which case the act of determining that the region-wide emergency situation exists in the region could be based on the locations of the customer premises that provided the emergency state reporting being within the region. Still further, the act of determining that the region-wide emergency situation exists in the region could involve determining that at least a predefined threshold large group (e.g., number, percentage, etc.) of multiple customer premises in the region has reported detected emergency state.

As further discussed above, the method could additionally include (e.g., as part of the determining and/or taking action) the computing system determining a trajectory of the reported emergency state and using the determined trajectory of the reported emergency state as a basis to identify another customer premises that will be emergency-impacted.

Still further, as discussed above, the action taken by the computing system in response to its determining that the region-wide emergency situation exists in the region could depend on the type of emergency situation and/or could take various forms. For instance, the action could involve causing electricity to be turned off at a plurality of the multiple customer premises in the region, including possibly selecting the plurality of the multiple customer premises based on determining that at least one person or pet is present respectively at each customer premises of the plurality.

Yet further, as discussed above, taking action by the computing system in response to the determining, based on the emergency-state reporting provided by the multiple customer premises in the region, that the region-wide emergency situation exists in the region, could involve the computing system sending one or more messages to each of the multiple customer premises in the region, the one or more messages triggering at each of the multiple customer premises at least one operation such as (i) disconnecting at least one utility at the customer premises, (ii) causing one or more battery-powered devices at the customer premises to increase their level of battery energy, (iii) causing one or more emergency-state sensors at the customer premises to increase their sensitivity to detecting an emergency state, and/or (iv) causing one or more cameras at the customer premises to begin recording video.

In addition or alternatively, as discussed above, taking action by the computing system in response to its determining, based on the emergency-state reporting provided by the multiple customer premises in the region, that the region-wide emergency situation exists in the region, could involve the computing system sending one or more messages to at least one customer premises in the region that did not report a detected emergency state.

Still further, as discussed above, the action taken by the computing system in response to the determining, based on the emergency-state reporting provided by the multiple customer premises in the region, that the region-wide emergency situation exists in the region, could involve (i) reporting to an insurance company, (ii) sending necessities to impacted people, (iii) reporting to a government agency, and/or (iv) reporting to a utility, among other possibilities.

The present disclosure also contemplates a computing system configured to carry out such a method and/or other operations described herein. Further, the present disclosure contemplates one or more non-transitory computer-readable media encoded with, embodying, or otherwise storing program instructions executable by a processor (e.g., one or more processors) to carry out various operations as described herein.

Exemplary embodiments have been described above. Those skilled in the art will understand, however, that changes and modifications may be made to these embodiments without departing from the true scope and spirit of the invention.

What is claimed is:

1. A method of using crowdsourcing to predict and respond to emergency impact, the method comprising:

receiving into a computing system emergency-state reporting provided by multiple customer premises in a region;

determining by the computing system, based on the received emergency-state reporting provided by the multiple customer premises in the region, that a region-wide emergency situation exists in the region; and taking action by the computing system, in response to the determining, based on the emergency-state reporting provided by the multiple customer premises in the region, that the region-wide emergency situation exists in the region, wherein taking action by the computing system in response to the determining, based on the emergency-state reporting provided by the multiple customer premises in the region, that the region-wide emergency situation exists in the region, comprises sending by the computing system one or more messages to each of the multiple customer premises in the region, the one or more messages triggering at each of the multiple customer premises at least one customer-premises operation comprising causing one or more emergency-state sensors at the customer premises to increase their sensitivity to detecting emergency state, wherein increasing sensitivity of each of the one or more emergency-state sensors to detecting emergency state comprises reducing a threshold of the sensor for sensing emergency state.

2. The method of claim 1, wherein the computing system is centralized, and wherein receiving into the computing system the emergency-state reporting provided by the multiple customer premises in the region comprises receiving by the computing system, respectively from each of the multiple customer premises, an emergency-state report indicating emergency state detected at the customer premises.

3. The method of claim 1, wherein the computing system is distributed among the multiple customer premises, and wherein receiving into the computing system the emergency-state reporting provided by the multiple customer premises in the region includes propagating emergency-state reporting from customer premises to customer premises in the region.

4. The method of claim 1, wherein each of the multiple customer premises in the region includes respectively at least one emergency-state sensor configured to sense emergency state at the customer premises, and wherein the emergency-state reporting provided by the multiple customer premises in the region is emergency-state reporting generated based on emergency-state sensing by the at least one emergency-state sensor respectively at each customer premises in the region.

5. The method of claim 1, wherein determining by the computing system, based on the received emergency-state reporting provided by the multiple customer premises in the region, that the region-wide emergency situation exists in the region comprises determining by the computing system that the emergency-state reporting from the multiple customer premises in the region indicates a same type of emergency at each of the multiple customer premises.

6. The method of claim 1, wherein the emergency-state reporting provided by each of the multiple customer premises in the region correlates with a location of the customer premises, wherein determining by the computing system, based on the received emergency-state reporting provided by the multiple customer premises in the region, that the region-wide emergency situation exists in the region is based on the locations of the customer premises that provided the emergency state reporting being within the region.

7. The method of claim 1, wherein determining by the computing system, based on the received emergency-state reporting provided by the multiple customer premises in the region, that the region-wide emergency situation exists in the region comprises determining that at least a predefined threshold large group of multiple customer premises in the region has reported detected emergency state.

8. The method of claim 1, further comprising determining by the computing system a trajectory of reported emergency state, and using by the computing system the determined trajectory of reported emergency state as a basis to identify another customer premises that will be emergency-impacted.

9. The method of claim 1, wherein the action taken by the computing system in response to the determining, based on the emergency-state reporting provided by the multiple customer premises in the region, that the region-wide emergency situation exists in the region, depends on a type of the emergency situation.

10. The method of claim 1, wherein the action taken by the computing system in response to the determining, based on the emergency-state reporting provided by the multiple customer premises in the region, that the region-wide emergency situation exists in the region, comprises causing electricity to be turned off at a plurality of the multiple customer premises in the region.

11. The method of claim 10, wherein causing electricity to be turned off at a plurality of the multiple customer premises in the region comprises selecting the plurality of the multiple customer premises based on determining that at least one person or pet is present at each customer premises of the plurality.

12. The method of claim 1, wherein the one or more messages trigger at each of the multiple customer premises at least one additional customer-premises operation selected from the group consisting of:

disconnecting at least one utility at the customer premises; and causing one or more cameras at the customer premises to begin recording video.

13. The method of claim 1, wherein taking action by the computing system in response to the determining, based on the emergency-state reporting provided by the multiple customer premises in the region, that the region-wide emergency situation exists in the region, comprises sending by the computing system one or more messages to at least one customer premises in the region that did not report detected emergency state.

14. The method of claim 1, wherein the action taken by the computing system in response to the determining, based on the emergency-state reporting provided by the multiple customer premises in the region, that the region-wide emergency situation exists in the region, comprises at least one operation selected from the group consisting of:

reporting to an insurance company;

sending necessities to impacted people;

reporting to a government agency; and reporting to a utility.

15. The method of claim 1, wherein the at least one customer-premises operation further comprises causing one or more battery-powered devices at the customer premises to increase their level of battery energy.

16. A computing system comprising:

at least one network communication interfaces;

at least one processor;

at least one non-transitory data storage; and program instructions stored in the non-transitory data storage and executable by the processor to carry out operations including:

receiving emergency-state reporting provided by multiple customer premises in a region, determining, based on the received emergency-state reporting provided by the multiple customer premises in the region, that a region-wide emergency situation exists in the region, and taking action, in response to the determining, based on the emergency-state reporting provided by the multiple customer premises in the region, that the region-wide emergency situation exists in the region, wherein taking action in response to the determining, based on the emergency-state reporting provided by the multiple customer premises in the region, that the region-wide emergency situation exists in the region, comprises sending one or more messages to each of the multiple customer premises in the region, the one or more messages triggering at each of the multiple customer premises at least one customer-premises operation comprising causing one or more emergency-state sensors at the customer premises to increase their sensitivity to detecting emergency state, wherein increasing sensitivity of each of the one or more emergency-state sensors to detecting emergency state comprises reducing a threshold of the sensor for sensing emergency state.

17. The computing system of claim 16, wherein determining, based on the received emergency-state reporting provided by the multiple customer premises in the region, that the region-wide emergency situation exists in the region comprises determining that the emergency-state reporting from the multiple customer premises in the region indicates a same type of emergency at each of the multiple customer premises.

18. The computing system of claim 16, wherein the emergency-state reporting provided by each of the multiple customer premises in the region correlates with a location of the customer premises, wherein determining, based on the received emergency-state reporting provided by the multiple customer premises in the region, that the region-wide emergency situation exists in the region is based on the locations of the customer premises that provided the emergency state reporting being within the region.

19. The computing system of claim 16, wherein the operations include:

determining a trajectory of reported emergency state, and using the determined trajectory of reported emergency state as a basis to identify another customer premises that will be emergency-impacted.

20. The computing system of claim 16, wherein the at least one customer-premises operation further comprises causing one or more battery-powered devices at the customer premises to increase their level of battery energy.

21. A non-transitory computer-readable medium having stored thereon instructions executable by at least one processor to carry out operations including:

receiving emergency-state reporting provided by multiple customer premises in a region;

determining, based on the received emergency-state reporting provided by the multiple customer premises in the region, that a region-wide emergency situation exists in the region; and taking action, in response to the determining, based on the emergency-state reporting provided by the multiple customer premises in the region, that the region-wide emergency situation exists in the region, wherein taking action in response to the determining, based on the emergency-state reporting provided by the multiple customer premises in the region, that the region-wide emergency situation exists in the region, comprises sending one or more messages to each of the multiple customer premises in the region, the one or more messages triggering at each of the multiple customer premises at least one customer-premises operation comprising causing one or more emergency-state sensors at the customer premises to increase their sensitivity to detecting emergency state, wherein increasing sensitivity of each of the one or more emergency-state sensors to detecting emergency state comprises reducing a threshold of the sensor for sensing emergency state.

22. The non-transitory computer-readable medium of claim 21, wherein the operations include:

determining a trajectory of reported emergency state, and using the determined trajectory of reported emergency state as a basis to identify another customer premises that will be emergency-impacted.

23. The non-transitory computer-readable medium of claim 21, wherein the at least one customer-premises operation further comprises causing one or more battery-powered devices at the customer premises to increase their level of battery energy.

* * * * *